United States Patent [19]
Davis

[11] Patent Number: 5,386,661
[45] Date of Patent: Feb. 7, 1995

[54] LIVE BAIT FISH HOOK

[76] Inventor: Franklin Davis, 4330 Harbor Blvd., Port Charlotte, Fla. 33952

[21] Appl. No.: 105,429

[22] Filed: Aug. 13, 1993

[51] Int. Cl.$^6$ .............................................. A01K 83/06
[52] U.S. Cl. ...................................... 43/44.8; 43/44.2
[58] Field of Search .................... 43/44.8, 44.2, 44.6, 43/44.82

[56] References Cited

U.S. PATENT DOCUMENTS

| | | | |
|---|---|---|---|
| 1,150,386 | 8/1915 | Rife | 43/44.8 |
| 1,766,279 | 6/1930 | Brown | 43/44.8 |
| 1,791,723 | 2/1931 | Hampton | 43/44.8 |
| 1,863,544 | 6/1932 | Prouse | 43/44.8 |
| 2,237,389 | 4/1941 | Ludwig | 43/44.8 |
| 2,605,580 | 8/1952 | Moore | 43/44.8 |
| 2,871,611 | 2/1959 | Shepard, Jr. | 43/44.2 |
| 2,938,296 | 5/1960 | Kracht | 43/44.8 |
| 3,435,553 | 4/1969 | Conley | 43/44.2 |
| 3,748,773 | 7/1973 | Goforth | 43/44.8 |

*Primary Examiner*—P. Austin Bradley
*Assistant Examiner*—Chuck Y. Mah
*Attorney, Agent, or Firm*—William E. Noonan

[57] ABSTRACT

A fish hook for carrying live bait fish is disclosed. The hook includes a curved, primary shaft that is attached at an upper end to a fishing line. A barbed, pointed section is connected to a lower end of the primary shaft. A secondary shaft is flexibly interconnected to and extends from the primary shaft and is insertible through the mouth and gill of a live bait fish. A clasp selectively interconnects the primary shaft and a distal portion of the secondary shaft to restrict removal of secondary shaft from the live bait fish.

11 Claims, 1 Drawing Sheet

LIVE BAIT FISH HOOK

FIELD OF INVENTION

This invention relates to a fish hook to which a live bait fish may be effectively and securely attached.

BACKGROUND OF THE INVENTION

Fishermen employ many different types of live and artificial baits. Fish are generally most attracted to bait which is moving. Artificial bait can be moved by jigging the fishing tackle or by employing various artificial lures which exhibit mechanical movement. Jigging requires constant effort by fisherman. Mechanical lures may require batteries and can malfunction.

Live bait fish eliminate the above problems. Additionally, they are preferable to artificial baits because they exhibit natural swimming movement that can better attract fish. However, when a live bait fish is hooked in a conventional manner, it tends to rapidly weaken and die. As a result, the bait stops moving and fewer fish are attracted.

SUMMARY OF THE INVENTION

It is therefore an object of this invention to provide an improved fish hook that permits live bait to be effectively and securely attached to and carried by the hook.

It is a further object of this invention to provide a fish hook that is attached to live bait fish without seriously harming or killing the bait.

It is a further object of this invention to provide a fish hook that permits attached bait to move for extended periods so that an increased number of fish are lured.

It is a further object of this invention to provide a live bait fish hook that is relatively simply and uncomplicated to construct and operate.

This invention results from a realization that more fish will be lured and fishing will be improved by mourning a bait fish on a hook without killing or seriously injuring the bait fish. This permits the bait fish to keep moving for extended periods so that it continues to attract fish.

This invention features a fish hook for carrying a live bait fish, which fish hook includes a curved primary shaft having means connected to an upper end thereof for attaching the hook to a fishing line, and a barbed, pointed section connected to a lower end thereof. A secondary shaft is flexibly interconnected to and extends from the primary shaft and is insertible through the mouth and gill of the live bait fish. Clasp means selectively interconnect the primary shaft and a distal portion of the secondary shaft to restrict removal of the secondary shaft from the live bait fish.

In a preferred embodiment the means for attaching include an eyelet. The secondary shaft may include spring means for urging the distal portion of the secondary shaft apart from the primary shaft and for permitting the distal portion to be closed relative to the primary shaft. The distal portion of the secondary shaft preferably includes a rounded, enlarged end. The spring means may be integral with the secondary shaft and may urge the secondary shaft apart from the primary shaft at an angle of 40°–50°.

The clasp means may include a hook element carried by the primary shaft for selectively engaging and holding the distal portion when the distal portion is closed relative to the primary shaft. Alternatively, the clasp means may include a hook element carried by the distal portion of the secondary shaft for selectively engaging and holding the primary shaft when the distal portion is closed relative to the primary shaft.

DETAILED DESCRIPTION OF PREFERRED EMBODIMENTS

Other objects, features and advantages will occur from the following description of preferred embodiments and the accompanying drawings, in which.

A fish hook according to this invention is constructed of a single unitary piece of material. Preferably a sturdy steel wire material is employed and the hook is formed by casting, soldering, stamping or other conventional techniques. A relatively small gauge wire is utilized in accordance with known fish hook constructions.

The fish hook includes a curved primary shaft having an eyelet at one end for attaching to a fishing line and a barbed, pointed hook formed at the other end. A secondary shaft is unitarily connected to the primary shaft and extends therefrom at an angle of approximately 40°–50°. The secondary shaft includes material and a gauge that are similar to those of the primary shaft. The shafts are resiliently interconnected such that they are urged apart at the above described angle and are able to be squeezed together. Typically the secondary shaft includes an integral spring formed proximate the junction with the primary shaft. This spring biases the distal end portion of the secondary shaft apart from the primary shaft.

A clasp is provided for holding the primary and secondary shafts closed. In one embodiment the clasp includes a hook element that is carried by the primary shaft. A distal portion of the secondary shaft engages and is held by the clasp when the shafts are squeezed together such that the secondary shaft is held in a closed condition. Alternatively, a hook element may be carried at the distal end of the secondary shaft. In such an embodiment, the clasp may be manipulated to engage and hold the primary shaft when the shafts are squeezed together.

To engage the hook with a bait fish, the secondary shaft is opened and inserted through the fishes mouth and gill. The clasp is then engaged to close the shafts. As a result, the fish is unable to escape from the hook, but at the same time is not seriously injured and remains alive for an extended time to yield improved fishing.

Figure 1:
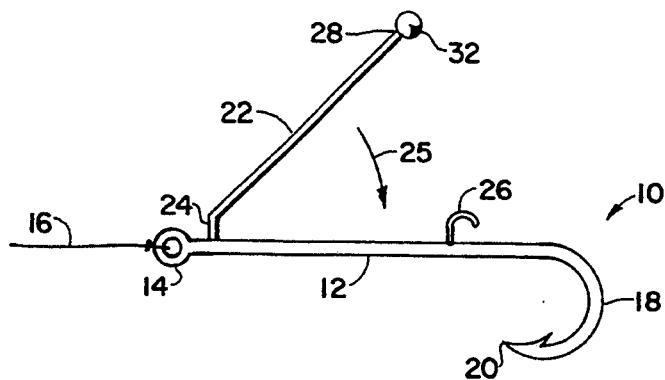
FIG. 1 is an elevational side view of a preferred fish hook according to this invention.

There is shown in FIG. 1 a fish hook 10, which includes an elongate primary shaft 12. The shaft has at one end an eyelet 14 that is tied or otherwise engaged in a known manner by a fishing line 16. Primary shaft 12 is curved at 18 in the manner of a conventional fish hook and includes a barbed, pointed distal end 20.

A secondary shaft 22 is flexibly interconnected to and extends at an angle from primary shaft 12. Secondary shaft 22 is somewhat shorter than primary shaft 12 and is attached to the primary shaft in one of various ways. For example, the shafts may be welded together. Alternatively, they may be stamped or cast as a unitary piece.

The secondary shaft includes an integral resilient portion 24 forming a spring that urges shaft 22 apart from shaft 12 in the manner shown in FIG. 1. Typically, shafts 12 and 22 form an angle of approximately, 40°–50° so that engagement of the hook with a bait fish is facilitated. However, this preferred angle is not an absolute limitation of the invention and various other angles may be formed between the primary and secondary shafts. Resilient portion 24 permits shaft 22 to be flexibly closed, in the direction of arrow 25, into a position that is generally parallel to shaft 12.

A clasp is formed along the primary shaft 12 for selectively holding secondary shaft 22 in a closed condition relative to primary shaft 12. Specifically, the clasp is defined by a hook element 26 that is attached to and extends generally transversely from primary shaft 12. Hook element 26 is composed of a material similar to that of the rest of the fish hook 10. Element 26 may be welded or formed as a unitary piece with the rest of the hook. To close shaft 22, the shaft is flexed in the direction of arrow 25 and a distal portion 28 of shaft 22 is manipulated and retainably engaged with hook element 26 in the manner shown in FIG. 2.

Figure 2:
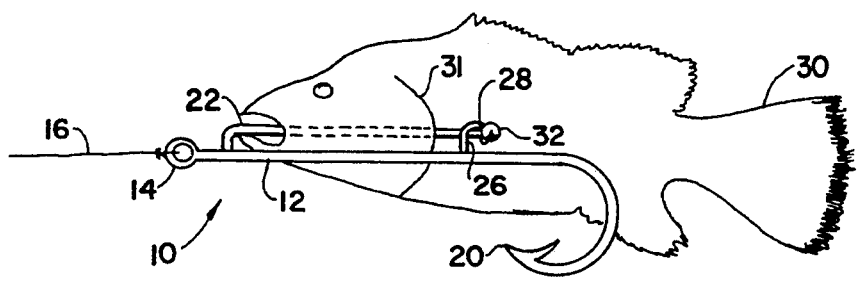
FIG. 2 is an elevational side view of the fish hook of FIG. 1 engaged with a live bait fish.

FIG. 2 further illustrates a minnow 30 or other bait fish attached to fish hook 10. The hook is secured to the minnow by first opening secondary shaft 22 relative to primary shaft 12, as illustrated in FIG. 1. Shaft 22 is inserted first through the mouth of the fish and then out through its gills 31. The shaft includes a rounded distal end 32, which resembles the end of a bobbie pin or similar clip. This rounded end may be inserted through the mouth and gills of the fish without causing serious injury. If the secondary shaft were to include a sharpened or pointed end, this would tend to injure the fish. Because shaft 22 is urged approximately 40°–50° apart from shaft 12, the secondary shaft may be inserted through the fish quickly and conveniently without interference from the primary shaft or hook element 26. During the insertion step, primary shaft 12 and the eyelet and barbs formed at either end thereof remain outside of fish 30. Following insertion of shaft 22 through the mouth and gill of the fish, shaft 22 is squeezed closed in the direction of arrow 25, FIG. 1, and distal portion 28 is engaged with and held by hook element 26. As a result, fish 30 is securely attached to fish hook 10 and cannot break free of the hook. In particular, if the fish attempts to dislodge the secondary shaft, it is blocked by hook element 26, which engages the distal portion of the secondary shaft. At the same time, the bait fish is able to move about and breath relatively easily for an extended period of time. This permits the bait fish to live longer so that it remains attractive to larger fish that are being sought by the fisherman.

Normally, after a certain period, the fisherman will desire to remove bait fish 30 and replace it with a fresh, live fish. This is easily accomplished by disengaging shaft 22 from hook element 28. Spring portion 24 causes the shaft 22 to open into the position shown in FIG. 1. This permits shaft 22 to be slid out through the gill and mouth of the bait fish.

Figure 3:
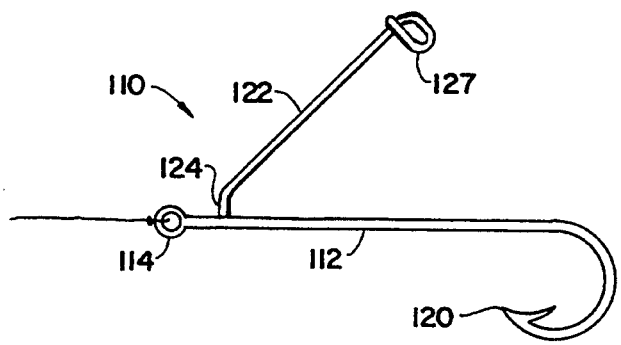
FIG. 3 is an elevational side view of an alternative preferred fish hook according to this invention.
Figure 4:
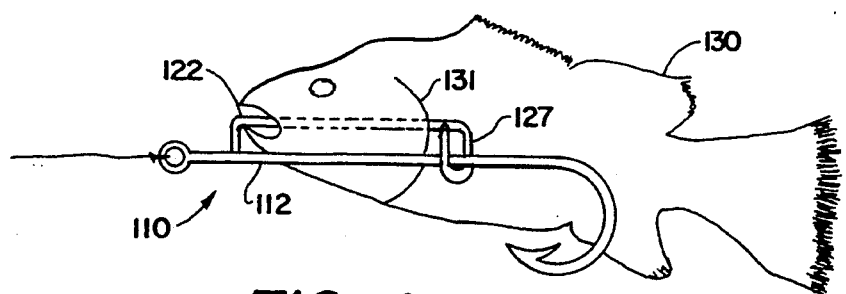
FIG. 4 is an elevational side view of the fish hook of FIG. 3 engaged with a live bait fish according to the teaching of this invention.

An alternative fish hook 110, in accordance with this invention, is illustrated in FIGS. 3 and 4. Again, the hook comprises an elongate, curved shaft 112 having an eyelet 114 at one end and a barbed pointed portion 120 at the opposite end. A secondary shaft 122 is flexibly attached to shaft 112 at a resilient junction portion 124. The junction portion includes an integral spring that urges shaft 122 apart from shaft 112 in the manner previously described.

The distal end portion of shaft 122 includes a hook-like clasp 127 that comprises a unitary piece with the secondary shaft. Shaft 122 may be squeezed against resilient junction portion 124 and clasp 127 may be engaged with shaft 112 to hold shafts 112 and 122 in a closed condition, such as is shown in FIG. 4.

A bait minnow 130, FIG. 4, is secured to hook 110 in a manner similar to that previously described. In particular, fish hook 10 is first set into the open condition shown in FIG. 3. The shaft is then inserted through the fish's mouth and out through the fish's gill 131. This operation is slightly more difficult than in the previous embodiment because the distal end of shaft 122 includes the hook-like clasp 127. Nonetheless, with relatively minimal manipulation, this insertion is achieved. Next, the shafts 112 and 122 are squeezed together and clasp 127 is manipulated and engaged with shaft 112. As a result, the shafts 112 and 122 are closed and fish 130 is secured to hook 110. The fish remains in this condition until the bait must be changed. At that time, hook 110 is opened by disengaging clasp 127 from shaft 112 and fish 130 is removed from the secondary shaft.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A fish hook for carrying a live bait fish, said fish hook comprising:

a curved primary shaft having means connected to an upper end thereof for attaching said fish hook to a fishing line, and a barbed, pointed section connected to a lower end thereof;

a secondary shaft flexibly interconnected to and extending from said primary shaft and being insertible through the mouth and gill of the live bait fish, said secondary shaft having a rounded, bulbous distal end which enables said secondary shaft to be inserted through the mouth and gill of the bait fish without causing serious injury to the fish; and clasp means for selectively interconnecting said primary shaft and a distal portion of said secondary shaft to restrict removal of said secondary shaft from the live bait fish, said clasp means including a hook element carded by said primary shaft for selectively engaging and holding said distal portion when said distal portion is closed relative to said primary shaft.

2. The device of claim 1 in which said means for attaching include an eyelet.

3. The device of claim 1 in which secondary shaft includes spring means for urging said distal portion of said secondary shaft apart from said primary shaft and for permitting said distal portion to be closed relative to said primary shaft.

4. The device of claim 3 in which said spring means are integral with said secondary shaft.

5. The device of claim 3 in which said spring means urge said secondary shaft apart from said primary shaft at an angle of 40°–50°.

6. A fish hook for carrying a live bait fish, said fish hook comprising:

a curved primary shaft having means connected to an upper end thereof for attaching said fish hook to a fishing line, and a barbed, pointed section connected to a lower end thereof;

a secondary shaft flexibly interconnected to and extending from said primary shaft and being insertible through the mouth and gill of the live bait fish, said secondary shaft including spring means for urging a distal portion of said secondary shaft apart from said primary shaft at an angle of 40°–50° and for permitting said distal portion to be closed relative to said primary shaft, said distal portion including a rounded, bulbous distal end; and clasp means for selectively interconnecting said primary shaft and said distal portion of said secondary shaft to restrict removal of said secondary shaft from the live bait fish.

7. The device of claim 6 in which said means for attaching include an eyelet.

8. The device of claim 6 in which said clasp means include a hook element carried by said primary shaft for selectively engaging and holding said distal portion when said distal portion is closed relative to said primary shaft.

9. The device of claim 6 in which said clasp means include a hook element carried by said distal portion for selectively engaging and holding said primary shaft when said distal portion is closed relative to said primary shaft.

10. The device of claim 6 in which said spring means are integral with said secondary shaft.

11. A fish hook for carrying a live bait fish, said fish hook comprising:

a curved primary shaft having means connected to an upper end thereof for attaching said fish hook to a fishing line, and a barbed, pointed end connected to a lower end thereof;

a secondary shaft flexibly and unitarily interconnected to said primary shaft between said means for attaching and said pointed section and extending from said primary shaft and being insertible through the mouth and gill of a live bait fish, said secondary shaft having a rounded, bulbous distal end which enables said secondary shaft to be inserted through the mouth and gill of the bait fish without causing serious injury to the fish, said secondary shaft further including spring means for urging a distal portion of said secondary shaft apart from said primary shaft at an angle of 40°–50° and for permitting said distal portion to be closed relative to said primary shaft; and clasp means for selectively interconnecting said primary shaft and said distal portion of said secondary shaft to restrict removal of said secondary shaft from the live bait fish, said clasp means including a hook element carded by said primary shaft for selectively engaging and holding said distal portion when said distal portion is closed relative to said primary shaft.

* * * * *